No. 866,226. PATENTED SEPT. 17, 1907.
J. S. RUSSELL.
PLANT CUTTER.
APPLICATION FILED MAR. 16, 1907.

Witnesses
F. L. Onrand
L. E. Barkley

Inventor
Joseph S. Russell
By Frank S. Appleman
Attorney

UNITED STATES PATENT OFFICE.

JOSEPH S. RUSSELL, OF CLOVER, UTAH.

PLANT-CUTTER.

No. 866,226.　　　Specification of Letters Patent.　　　Patented Sept. 17, 1907.

Application filed March 16, 1907. Serial No. 362,769.

*To all whom it may concern:*

Be it known that I, JOSEPH S. RUSSELL, a citizen of the United States of America, residing at Clover, in the county of Tooele and State of Utah, have invented certain new and useful Improvements in Plant-Cutters, of which the following is a specification.

This invention relates to new and useful improvements in plant cutters and has relation more particularly to a device for destroying or clearing a field of sage brush in order that the ground may be prepared for agricultural purposes.

It is an object of this invention to provide a novel device of this character which will be plow-like in structure and which will effectually cut the brush and throw it to one side where it may be easily and conveniently collected.

It is also an object of the invention to provide novel means whereby the depth of the cutter may be regulated. This regulation is found necessary in order to compensate for the undulations of the ground.

Finally an object of this invention is to provide a device of the character noted, which will possess advantages in points of simplicity, efficiency and durability, proving at the same time comparatively inexpensive to manufacture.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 1:
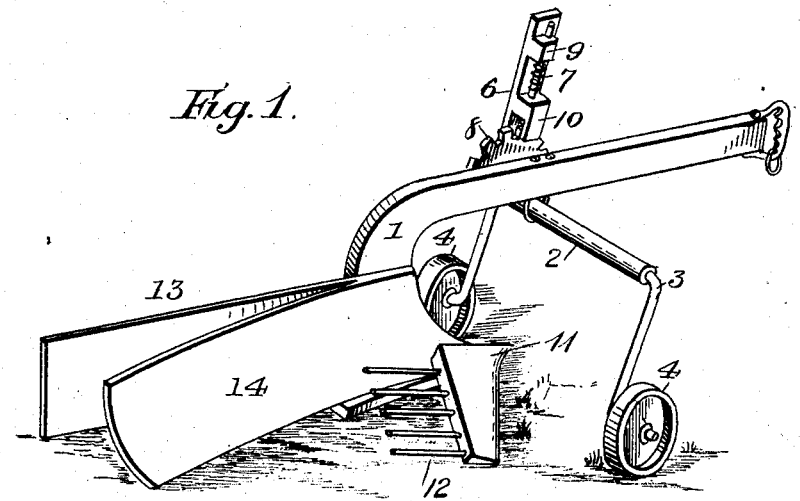
Figure 2:
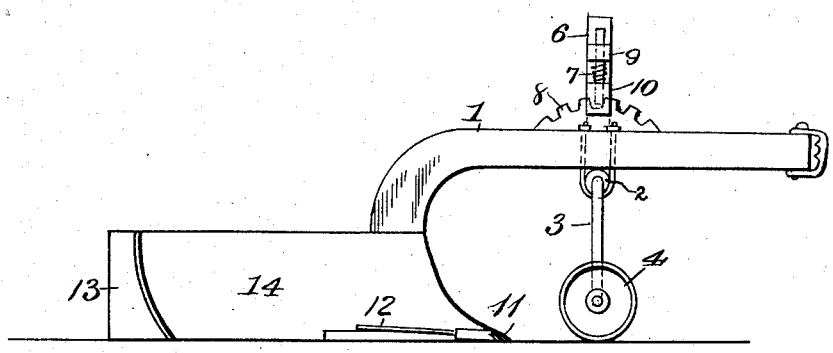

Figure 1, is a view in perspective of the invention. Fig. 2, is a view in side elevation of the device.

In these drawings 1, denotes a beam as is usually employed with agricultural plows of ordinary construction. This beam has secured to its under edge a sleeve or spindle 2, which extends transversely thereof to either side. Mounted within this sleeve is a shaft 3, which is approximately U-shaped in form and has mounted thereon the supporting wheels 4. To one of the stems of the axle is secured an arm 6, which extends above the beam and is operated with a sliding pawl 7, which actuates in conjunction with a notched regment 8, secured to the beam. By this means it will be readily understood that the beam may be raised or lowered at will and held in its different positions by this pawl 7. This pawl slides in the brackets 9 and 10, carried by the pawl. It is to be noticed that the lower bracket 10, is provided with an extension which is adapted to contact with the side of the segment 8, in order to prevent any lateral movement of the shaft in one direction, the arm 6, preventing movement in an opposite direction.

To the lower end of the beam is secured the plow-point 11. This plow point consists of a shear quite flat, running almost but not quite at right angles from the point. Extending from the rear edge of the shear and secured thereto are the fingers 12, which are intended to catch the sage as cut and to allow any dirt that may be loosened to drop again to the ground. In other words, these fingers provide a means which screens the sage.

Secured to the beam and extending rearwardly therefrom is a land side 13, and to this land side is secured a wing or flange 14, which extends from the plow on a curve and this wing or flange 14, is bent transversely as is more particularly shown in Fig. 1 of the drawings. This is for the purpose of throwing the sage brush to one side after it leaves the fingers of the plow, leaving it in a convenient position for burning or loading.

While this invention appears very simple in construction it has been found most efficient and advantageous in practice performing the functions desired of it.

Having fully described my invention what I claim as new and desire to secure by Letters Patent, is—

In combination, a beam, a land side projecting rearwardly therefrom, a plow carried by the beam, said plow comprising an approximately flat shear, fingers extending from the rear of the plow, and a flange carried by the land side extending from the beam adjacent the plow on a curve and being bent transversely.

In testimony whereof I affix my signature in the presence of two witnesses, this 9th day of March, 1907.

JOSEPH S. RUSSELL.

Witnesses:
　J. M. HAMILTON,
　A. E. EDHOLM.